March 17, 1970 — W. P. SMITH — 3,500,679
WELD TESTING DEVICE
Filed July 29, 1968
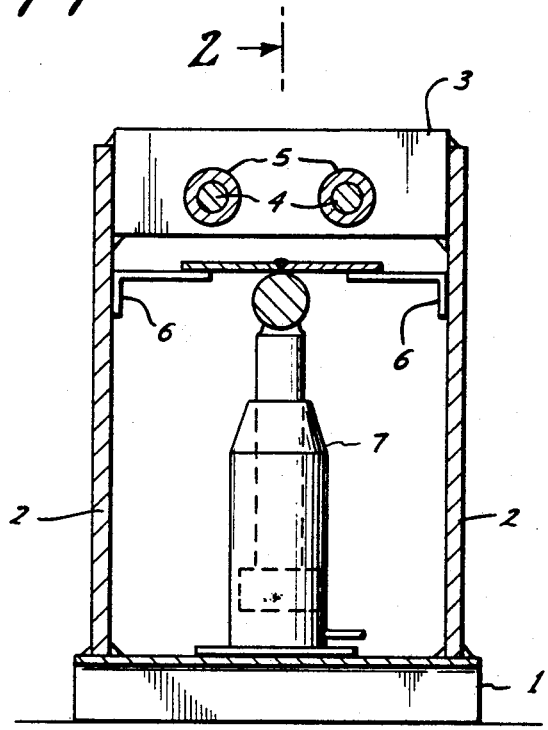
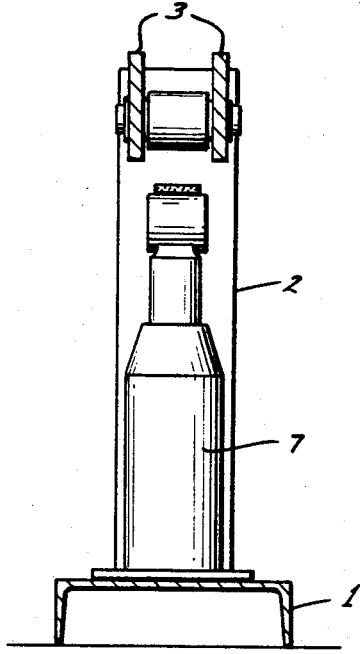
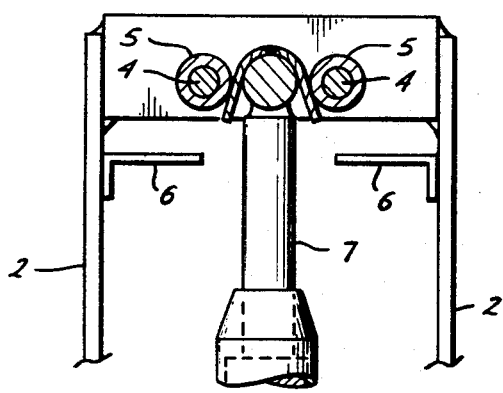
William P. Smith
INVENTOR.
BY
ATTORNEY

United States Patent Office

3,500,679
Patented Mar. 17, 1970

---

3,500,679
WELD TESTING DEVICE
William P. Smith, 4015 Underwood,
Houston, Tex. 77025
Filed July 29, 1968, Ser. No. 748,440
Int. Cl. G01n 3/20
U.S. Cl. 73—100                      1 Claim

ABSTRACT OF THE DISCLOSURE

A device for testing the welding ability of a student or an applicant for employment as a welder, having means for bending a welded plate into a substantially U-shape.

SUMMARY OF THE INVENTION

A device for use in testing the ability of a student, or an applicant for employment as a welder, to properly weld plate material, said device having means for bending the welden work into a substantially U-shape, and having novel antifriction means to assist in such bending.

BRIEF DESCRIPTION OF THE DRAWINGS

FIGURE 1 is an elevational view of the device, showing a piece of welded plate to be tested mounted in the device.

FIGURE 2 is a side elevational cross sectional view taken on the line 2—2 of FIGURE 1, and FIGURE 3 is a front elevational view, showing the device in final position, with the work bent.

DESCRIPTION OF THE PREFERRED EMBODIMENT

In the drawings the numeral 1 designates the base member, which may be of a solid, rigid material of sufficient strength to withstand the high pressures to be exerted against same. Side members, 2, 2, are mounted on the base member 1, as by welding, and are joined at their other ends by means of the cross members 3, 3 which are welded to the side members 2, 2.

The cross members 3, 3 have the horizontally aligned bearing members 4, 4 having rotatable contact surfaces 5, 5 mounted thereon. A pair of angle irons, as 6, 6, may be mounted on the inside walls of the members 2, 2, as work holders, to hold the plate to be tested in position beneath the bearings 4, 4. A suitable pressure applying means, as the hydraulic jack 7, is mounted on the base 1, with the actuating arm of the jack 7 positioned beneath and in vertical alignment with the area between the bearings 4, 4.

A piece of plate, as 8, that has been welded is placed on the work holders 6, 6 with the weld positioned directly over the extended end of the actuating arm of the jack 7, and the jack is actuated to move the plate 8 upwardly against the contact surfaces 5, 5 of the bearings 4, 4 and the plate bent into a substantially U-shape by moving the jack actuating arm upwardly between the bearings 4, 4. The hydraulic pressure on the jack 7 may be then released and after the arm of the jack is retracted, the weld may be inspected for cracks or breaks, and the work properly classified.

While the foregoing is a preferred embodiment of the invention, it is by way of illustration only, the broad principle of the invention being defined by the appended claim.

What I claim is:

1. In a weld testing device, a base member, side members in horizontal alignment and in spaced relation member, cross members mounted on the extended ends of said side members, bearings mounted in said cross members in horizontal alignment and in spaced relation and pressure applying means mounted on said base and movable upwardly to a position between said bearings, and work holding means mounted on said side members to position the work to be tested.

References Cited

UNITED STATES PATENTS

| | | | |
|---|---|---|---|
| 2,032,989 | 3/1936 | Kenney et al. | 73—100 X |
| 2,158,008 | 5/1939 | Grant | 73—100 |
| 2,617,293 | 11/1952 | Schnadt | 73—100 X |
| 3,130,579 | 4/1964 | Cram et al. | 73—100 |
| 3,421,365 | 1/1969 | Dean et al. | 73—91 |

JERRY W. MYRACLE, Primary Examiner

U.S. Cl. X.R.

72—212